No. 673,690. Patented May 7, 1901.
R. S. SCHOELCH.
TRUCK.
(Application filed Nov. 27, 1900.)
(No Model.)
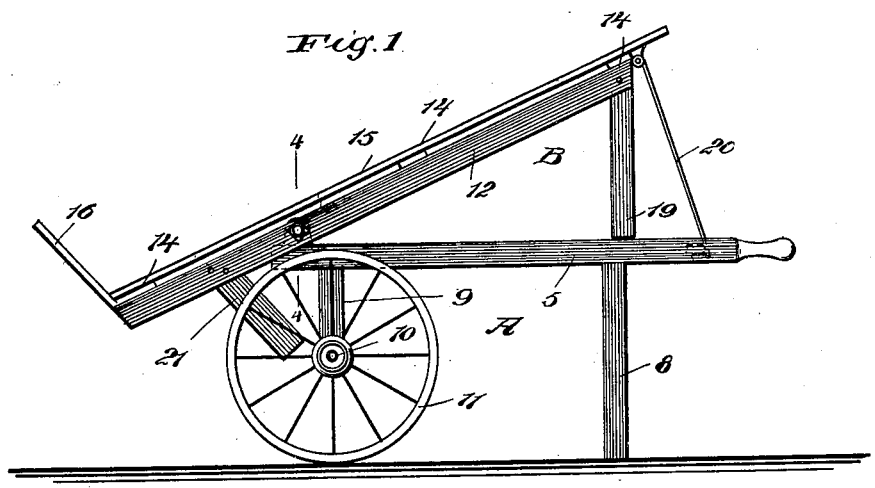
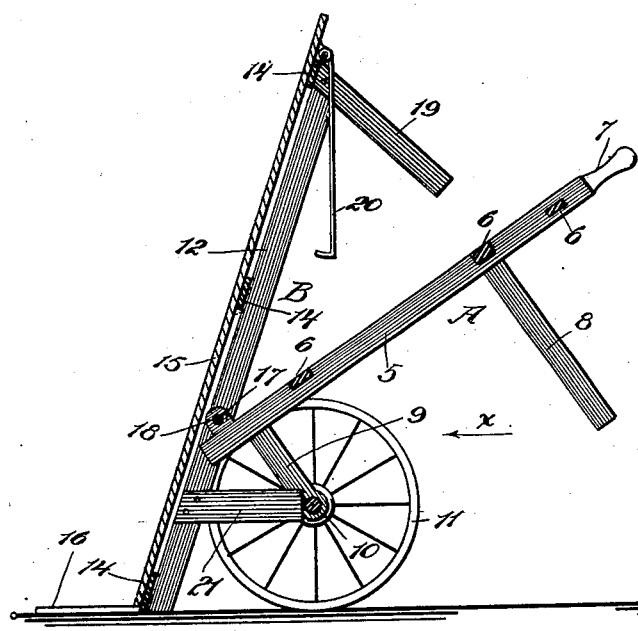
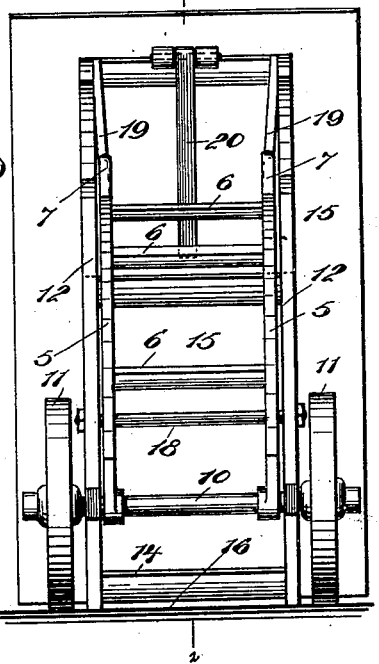
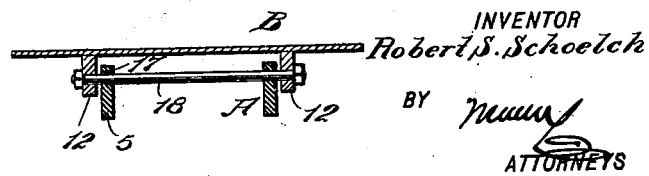
WITNESSES:
INVENTOR
Robert S. Schoelch
BY
ATTORNEYS

UNITED STATES PATENT OFFICE.

ROBERT S. SCHOELCH, OF SHELBYVILLE, INDIANA.

TRUCK.

SPECIFICATION forming part of Letters Patent No. 673,690, dated May 7, 1901.

Application filed November 27, 1900. Serial No. 37,871. (No model.)

*To all whom it may concern:*

Be it known that I, ROBERT S. SCHOELCH, a citizen of the United States, and a resident of Shelbyville, in the county of Shelby and State of Indiana, have invented a new and Improved Truck, of which the following is a full, clear, and exact description.

This invention relates to a truck intended to be manually operated and to carry weighty objects, the construction of the truck being such as to enable the heavy objects to be handled with greater ease than heretofore.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of the invention. Fig. 2 is a longitudinal sectional view substantially on the line 2 2 in Fig. 3, illustrating the position in which the truck is placed when ready to be loaded. Fig. 3 is an elevation of the same looking in the direction of the arrow $x$ in Fig. 2, and Fig. 4 is a cross-section on the line 4 4 of Fig. 1.

The truck comprises two parts, a lower part A and an upper part B, the part A constituting a body and the part B a platform for the load. The body A comprises side bars 5, rigidly connected by cross-pieces 6, extending between them, said bars having their rear ends formed with handles 7. The rear portions of the side bars A are supported by legs 8, and the front portions of the side bars are provided with downwardly-extending brackets 9, carrying an axle 10, on which the wheels 11 are mounted. The upper section B comprises side bars 12, similar in general function to the side bars 5 and connected rigidly together by cross-bars 14. These bars 12 carry the platform proper, 15, and at their front ends the bars 12 carry a foot 16, which is adapted to be projected under the load in the operation of placing the load on the truck, as is usual in connection with such apparatus. The side bars 5 of the body A of the truck have upwardly-extended brackets 17, arranged in transverse alinement and carrying a shaft 18, to which the side bars 12 of the upper part B of the truck are connected, so that the upper part B may rock on the lower part A around the axis of the shaft 18. The rear extremity of the upper part B of the truck is provided with legs 19, which are adapted to engage with the side bars 5 to limit the downward movement of the part B, holding it in the position shown in Fig. 1. When the upper part of the truck is in this position, an elongated hook 20 may be engaged with the rearmost cross-bar 6, so as to hold the two parts A and B together. For limiting the upward tilting movement of the part B of the truck struts 21 are attached to the front portions of the side bars 12 and are so disposed that when the part B is thrown, as indicated in Fig. 2, these struts will engage the axle 10 and will thus limit the movement of the upper part of the truck. With this arrangement a compound movement in loading the truck is effected, since to load the truck the parts should be moved, as shown in Fig. 2, and then the part A of the truck should first be moved down to engage its legs 8 with the ground, and finally the part B should be moved down to engage its legs 19 with the part A of the truck and said parts be connected by the hook 20. When the truck is in the position shown in Fig. 2 to receive a load and has received the load by the application of the power on the handles 7, the compound lever thus formed at 18 and 10 as a fulcrum causes the wheels of the truck to hug close to the load, and thus enables a very heavy load to be lifted by a small amount of power.

Having thus described my invention, I claim as new and desire to secure by Letters Patent—

1. A hand-truck having two sections pivotally connected together, the sections being arranged one above the other, an axle carried by the lower section, wheels on the axle, the axle being located at the front part of the truck and a strut attached to the upper section in position to engage the axle to limit the forward movement of the upper section.

2. A hand-truck having a lower section, brackets projecting downward therefrom, an axle carried by the brackets, wheels mounted on the axle, an upper section pivotally mounted on the lower section, and a strut attached to the upper section in position to engage the axle to limit the pivotal movement of the upper section on the lower section.

3. A hand-truck, comprising a lower section having brackets projecting downward from the front portion thereof, and a leg carried by the rear portion thereof, wheels mounted on the brackets, an upper section pivoted on the lower section, a strut projecting from the front portion of the upper section and arranged to engage a part of the lower section to limit the forward pivotal movement of the upper section, a leg carried by the rear portion of the upper section and arranged to engage the lower section to limit the rearward pivotal movement of the upper section, and a device for fastening the two sections together to prevent relative movement thereof.

In testimony whereof I have signed my name to this specification in the presence of two subscribing witnesses.

ROBERT S. SCHOELCH.

Witnesses:
HENRY SCHOELCH,
JOHN C. SCHOELCH.